Figure 1:
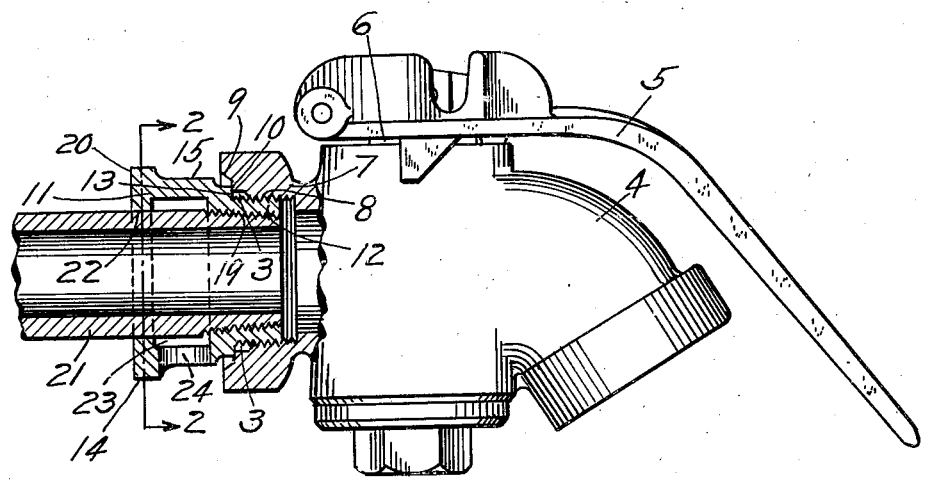

April 16, 1935.  A. A. MACKERT  1,998,283

ANGLE COCK DEVICE

Original Filed March 12, 1932

*INVENTOR*
ALBERT A. MACKERT
BY *Wm. M. Cady*
*ATTORNEY*

Patented Apr. 16, 1935

1,998,283

UNITED STATES PATENT OFFICE 1,998,283

ANGLE COCK DEVICE

Albert A. Mackert, Wilmerding, Pa., assignor to The Westinghouse Air Brake Company, Wilmerding, Pa., a corporation of Pennsylvania Original application March 12, 1932, Serial No. 598,321. Divided and this application February 11, 1933, Serial No. 656,273

2 Claims. (Cl. 285—13)

This invention relates to angle cocks used in fluid pressure brake systems and particularly to the fittings appurtenant thereto for attaching them to a car and for connecting them to the brake pipe, the present application being a division of my application, Serial No. 598,321, filed March 12, 1932.

Angle cocks commonly in use are provided with threaded bores for receiving the threaded end of a brake pipe in the manner of the usual pipe fitting, and consequently the threads of the pipe and angle cock body are subjected to lateral or transverse stresses which tend to loosen the joint and cause leakage. Where this type of fitting is employed, the brake pipe is usually fastened to the car adjacent to the angle cock which is supported by the pipe, and stresses imposed by the attached flexible hose connection in the operation of the angle cock valve further tend to loosen the angle cock.

Because of these objectionable features, improved angle cocks have recently been placed in service that are provided with a sleeve-like extension having a threaded bore for receiving the threaded end of a brake pipe, and with an unthreaded cylindrical portion which snugly engages the unthreaded exterior surface of the brake pipe at a point remote from the threaded portion of pipe, and which supports the pipe and relieves the threaded joint from transverse or lateral stresses.

The extension is provided with a hexagonal wrench receiving flange portion and an external annular groove which constitutes a seat for a U-bolt, which serves to fasten the angle cock to a car with a flat of the hexagonal portion in engagement with a flat plate or bracket provided on the car. Thus the angle cock is rigidly secured to the car and cannot turn relative to the brake pipe or transmit lateral stresses thereto tending to loosen it.

It is often necessary to remove the angle cocks for repair, and removal frequently so damages the threads of the angle cock that leakage would occur if replaced on the brake pipe. This renders the angle cock useless for further service, even though the valve portion thereof may be successfully repaired.

It is an object of this invention to provide a bushing which may be applied to an old type angle cock such as illustrated in the drawing and thus provide the advantages of the new improved type heretofore referred to. For this purpose, the angle cock body is rebored and tapped to receive the bushing, the bushing being provided with a stop shoulder for insuring a tight joint. The bushing is provided with a straight or cylindrical thread instead of a pipe thread, so that the stop shoulder may be drawn tightly into engagement with the sealing seat provided on the angle cock body, thus insuring a tight joint regardless of slight diametral discrepancies between the threaded portions of the joint.

A further object of the invention is to provide a bushing having the above noted characteristics and for the said purpose, wherein the bushing is provided with a flange spaced from said shoulder whereby a seat is defined between the said flange and the end face of the angle cock extension for receiving a U-bolt whereby the old type angle cock may be securely fastened to the car in the manner of the later improved type angle cock and mounting therefor, and wherein the bushing is provided with an unthreaded cylindrical portion for supporting the pipe at a point remote from the threaded portion thereof for the reason stated above. By reason of this bushing, the old type angle cock may be clamped directly to the car, thereby relieving the threaded joint of the cock from stresses characteristic of those applied to the old type of angle cock.

Figure 2:
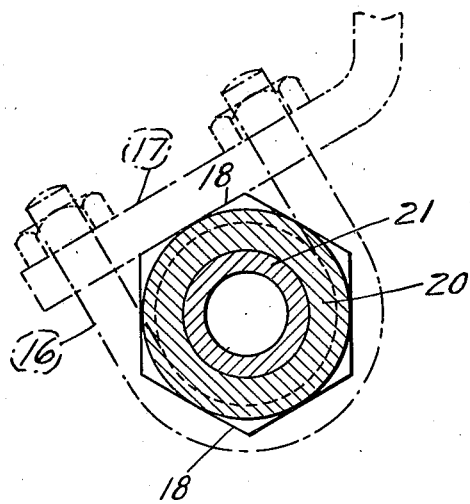

These and other objects of the invention that will be made apparent throughout the further description thereof are attained by means of the angle cock device hereinafter described and illustrated in the accompanying drawing; wherein Fig. 1 is an elevational view, partially in section, of an angle cock device embodying features of the invention; and Fig. 2 is a transverse section taken on the line 2—2 of Fig. 1.

Referring to Fig. 1, an old type angle cock device is shown which comprises a metal body 4 in which a valve of the plug type is mounted and which is actuated by an operating handle 5 that is attached to the stem 6 of the valve. The plug valve forms no part of this invention and therefore will not be specifically described.

As disclosed in Fig. 1, a bushing 11 is connected to an old type angle cock which has been rebored to receive the threaded end of the bushing. In this case, the angle cock pipe connection 7 is rebored and tapped so as to provide a cylindrical threaded bore 8 and the end face of the connection 7 is step recessed at 9 and 3 to provide a relatively narrow sealing seat 10. The bushing 11 is provided with a cylindrical externally threaded portion 12 which fits into the threaded bore 8 and is provided with a shoulder 13, of slightly less outside diameter than that of the sealing seat 10, which engages the sealing seat 10 to limit the inward movement of the bushing and, at the same time, provide a fluid tight metal-to-metal seal between the bushing and the bore of the angle cock body. The recess at 3 is to insure proper clearance for any imperfections at the base of the external thread of the bushing adjacent the shoulder 13. By reason of the fact that the exterior threaded portion of the bushing and the threaded bore of the angle cock body are cylindrical, the bushing may be screwed into the bore in the angle cock body until the shoulder 13 tightly engages the sealing seat 10. This would not be the case if tapered threads were employed because the threads might tighten before the shoulder 13 actually engages the sealing seat 10 and thus prevent further inward movement of the bushing. In such case, lateral stresses imposed upon the outer end of the bushing would be transmitted to the threaded portion of the bushing and cause loosening thereof.

The outer end of the bushing is provided with an annular flange 20 that provides an annular seat 15 between the flange 14 and the end face of the connection 7 for receiving a U-bolt 16 for attaching the angle cock to the flat face of a supporting plate secured to the car, as shown in Fig. 2.

The flat 18 of the hexagonal portion of the connection 7 and the periphery of the flange 20 engages the flat surface of the plate 17 and the flat 18 prevents rotation of the angle cock casing 4.

The bore of the bushing 11 is provided with a tapered threaded portion 19 for receiving the tapered threaded end of the brake pipe 21 as indicated in Fig. 1. The bushing 11 is also provided with an unthreaded bore 22 that is spaced from the threaded portion of the bore by an annular recess 23 that is aligned with a drainage opening 24 in the bushing for the purpose of permitting the escape of any liquid that might leak from the brake pipe past the threaded joint. The pipe is supported at a point remote from the threaded portion thereof by the unthreaded bore 22 of the bushing and therefore relieves the threaded joint from lateral or transverse stresses.

It is apparent from the foregoing that the angle cock equipped with the improved bushing is capable of supporting the brake pipe with the same security as is obtained by the mounting for the later type angle cocks referred to above and having an integral outer flange for providing a U-bolt seat.

While I have disclosed but one embodiment of the invention, it is obvious that many changes, omissions and additions may be made in the construction without departing from the spirit of the invention.

Having now described my invention, what I claim as new and desire to secure by Letters Patent, is:

1. The combination with an angle cock body having an outer face and a substantially cylindrical bore extending inwardly from said face, said bore having a threaded portion and an orifice portion which is provided with a pair of step recesses, the inner step recess being located adjacent the threaded portion of the bore, and the outer recess providing a relatively narrow sealing seat so disposed inwardly of the said face that the face protects the sealing seat from damage which would render the sealing action of the seat ineffective, of a bushing having an external step-recessed shoulder for cooperatively fitting the sealing seat on said cock body, said bushing having an externally threaded portion for engaging the threaded portion of the bore in said cock body to effect sealing engagement of the shoulder on said bushing with the sealing seat on the said cock body, and also having an internally threaded portion for receiving a threaded pipe, the first step recess insuring proper clearance for any imperfections at the base of the externally threaded portion.

2. The combination with an angle cock body having an outer face and a substantially cylindrical bore extending inwardly from said face, said bore having a threaded portion and an orifice portion which is step-recessed to provide a relatively narrow sealing seat so disposed inwardly of the said face that the face protects the sealing seat from damage which would render the sealing action of the seat ineffective, of a bushing having an external step-recessed shoulder of slightly less outside diameter than that of the sealing seat for cooperatively fitting the sealing seat on said cock body, said bushing having an externally threaded portion for engaging the threaded portion of the bore in said cock body to effect sealing engagement of the shoulder on said bushing with the sealing seat on the said cock body, and said bushing having an annular seat and a flange at the outer portion thereof so disposed and spaced from the outer face of the said cock body when the shoulder and the sealing seat are in sealing engagement that an annular groove is provided between the flange and the face for receiving an attaching U-bolt, said bushing also being provided with an internal threaded portion for receiving a threaded pipe.

ALBERT A. MACKERT.